United States Patent
Stevenson et al.

(10) Patent No.: US 9,600,121 B2
(45) Date of Patent: Mar. 21, 2017

(54) DRIVING SENSOR ELECTRODES FOR NOISE MEASUREMENT

(71) Applicant: Synaptics Incorporated, San Jose, CA (US)

(72) Inventors: Matthew Stevenson, San Jose, CA (US); Adam Schwartz, Redwood City, CA (US); Joseph Kurth Reynolds, Alviso, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 175 days.

(21) Appl. No.: 14/502,934

(22) Filed: Sep. 30, 2014

(65) Prior Publication Data

US 2015/0309658 A1   Oct. 29, 2015

Related U.S. Application Data

(60) Provisional application No. 61/984,577, filed on Apr. 25, 2014.

(51) Int. Cl.
*G06F 3/044* (2006.01)
*G06F 3/041* (2006.01)

(52) U.S. Cl.
CPC ......... *G06F 3/0418* (2013.01); *G06F 3/044* (2013.01)

(58) Field of Classification Search
CPC .............................. G06F 3/0418; G06F 3/044
USPC .................. 345/173–174, 178; 178/18.06
See application file for complete search history.

(56) References Cited

U.S. PATENT DOCUMENTS

| | | | |
|---|---|---|---|
| 9,209,802 B1 * | 12/2015 | Maharyta | H03K 17/955 |
| 2008/0157893 A1 | 7/2008 | Krah | |
| 2008/0309625 A1 | 12/2008 | Krah et al. | |
| 2008/0309628 A1 | 12/2008 | Krah et al. | |
| 2009/0303198 A1 * | 12/2009 | Yilmaz | H03K 17/9622 345/173 |
| 2011/0061948 A1 | 3/2011 | Krah et al. | |
| 2011/0115729 A1 * | 5/2011 | Kremin | G06F 3/0418 345/173 |
| 2011/0210939 A1 | 9/2011 | Reynolds et al. | |
| 2012/0001859 A1 * | 1/2012 | Kim | G06F 3/0418 345/173 |
| 2012/0013565 A1 | 1/2012 | Westhues et al. | |
| 2012/0018229 A1 | 1/2012 | Leuchtenberg et al. | |
| 2012/0200524 A1 * | 8/2012 | Vallis | G06F 3/044 345/174 |
| 2012/0217978 A1 * | 8/2012 | Shen | G06F 3/044 324/601 |

(Continued)

*Primary Examiner* — Hong Zhou
(74) *Attorney, Agent, or Firm* — Patterson + Sheridan, LLP

(57) ABSTRACT

In an example, a processing system for a capacitive sensing device includes a sensor module and a determination module. The sensor module includes sensor circuitry coupled to a plurality of transmitter electrodes and a plurality of receiver electrodes. The sensor module is configured to receive resulting signals from the plurality of receiver electrodes during a plurality of noise acquisition bursts while suspending transmission with the plurality of transmitter electrodes. The resulting signals include the effects of noise. The sensor module is further configured to introduce at least one time delay between a respective at least one pair of the plurality of noise acquisition bursts. The determination module is configured to determine an interference measurement for a first frequency based on the resulting signals.

20 Claims, 4 Drawing Sheets

(56) References Cited

U.S. PATENT DOCUMENTS

| | | | |
|---|---|---|---|
| 2012/0262222 A1* | 10/2012 | Schwartz | G06F 3/0418 327/517 |
| 2014/0049507 A1* | 2/2014 | Shepelev | G06F 3/0412 345/174 |
| 2014/0074436 A1* | 3/2014 | Voris | G01R 27/2605 702/194 |
| 2015/0123950 A1* | 5/2015 | Ding | G06F 3/0418 345/178 |

* cited by examiner

DRIVING SENSOR ELECTRODES FOR NOISE MEASUREMENT

CROSS-REFERENCE TO RELATED APPLICATIONS

This application claims priority to U.S. Provisional Patent Application Ser. No. 61/984,577 filed Apr. 25, 2014, which is incorporated by reference herein in its entirety.

BACKGROUND

Field of the Disclosure

Embodiments generally relate to input sensing and, in particular, to driving sensor electrodes for noise measurement.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Input objects can be at or near the surface of the proximity sensor device ("touch sensing") or hovering over the surface of the proximity sensor device ("proximity sensing" or "hover sensing"). Proximity sensor devices may be used to provide interfaces for the electronic system. For example, proximity sensor devices are often used as input devices for larger computing systems (such as touchpads integrated in, or peripheral to, notebook or desktop computers). Proximity sensor devices are also often used in smaller computing systems (such as touch screens integrated in cellular phones or tablet computers).

Proximity sensor devices can measure changes in mutual capacitance (or "transcapacitance") relating to the presence of an input object in a sensing region of the sensor device. Given an array of sensing regions, transcapacitance sensing can be used to generate a capacitive image, from which one or more input objects can be resolved at a given time. Proximity sensor devices can be deleteriously affected by noise. For example, narrow-band noise can: (1) decrease sensitivity of the sensor device, leading to missed detection of input object(s); and/or (2) cause spurious peaks in the capacitive image, leading to false detection of input object(s).

SUMMARY

Embodiments relate to driving sensor electrodes in a proximity sensor device for noise measurement. In an embodiment, a processing system for a capacitive sensing device includes a sensor module and a determination module. The sensor module includes sensor circuitry coupled to a plurality of transmitter electrodes and a plurality of receiver electrodes. The sensor module is configured to receive resulting signals from the plurality of receiver electrodes during a plurality of noise acquisition bursts while suspending transmission with the plurality of transmitter electrodes. The resulting signals include the effects of noise. The sensor module is further configured to introduce at least one time delay between a respective at least one pair of the plurality of noise acquisition bursts. The determination module is configured to determine an interference measurement for a first frequency based on the resulting signals.

In another embodiment, a method of operating a capacitive sensing device having a plurality of transmitter electrodes and a plurality of receiver electrodes includes: receiving resulting signals from the plurality of receiver electrodes during a plurality of noise acquisition bursts while suspending transmission with the plurality of transmitter electrodes, the resulting signals comprising effects of noise; introducing at least one time delay between a respective at least one pair of the plurality of noise acquisition bursts; and determining an interference measurement for a first frequency based on the resulting signals.

In another embodiment, an input device includes a plurality of transmitter electrodes, a plurality of receiver electrodes, and a processing system coupled to the plurality of transmitter electrodes and the plurality of receiver electrodes. The processing system is configured to receive resulting signals from the plurality of receiver electrodes during a plurality of noise acquisition bursts while suspending transmission with the plurality of transmitter electrodes. The resulting signals include effects of noise. The processing system is further configured to introduce at least one time delay between a respective at least one pair of the plurality of noise acquisition bursts. The processing system is further configured to determine an interference measurement for a first frequency based on the resulting signals.

BRIEF DESCRIPTION OF THE DRAWINGS

So that the manner in which the above recited features of embodiments can be understood in detail, a more particular description of embodiments, briefly summarized above, may be had by reference to embodiments, some of which are illustrated in the appended drawings. It is to be noted, however, that the appended drawings illustrate only typical embodiments and are therefore not to be considered limiting of scope, for other equally effective embodiments may be admitted.

To facilitate understanding, identical reference numerals have been used, where possible, to designate identical elements that are common to the figures. It is contemplated that elements of one embodiment may be beneficially incorporated in other embodiments.

DETAILED DESCRIPTION

The following detailed description is merely exemplary in nature and is not intended to limit the embodiments or the application and uses of such embodiments. Furthermore, there is no intention to be bound by any expressed or implied theory presented in the preceding technical field, background, brief summary or the following detailed description.

Various embodiments relate driving sensor electrodes in a capacitive sensor device for noise measurement. As noted above, noise in capacitive measurements can deleteriously affect capacitive sensor devices, leading to missed detection of input object(s) and/or false detection of input object(s). The capacitive sensor device can measure the noise in order to mitigate its effects on capacitive measurements. In an embodiment, the capacitive sensor device determines interference measurements (e.g., measures of noise) according to one or more interference metrics (IMs). Interference measurements can be measured through a plurality of noise acquisition bursts using receiver electrodes. During each noise acquisition burst, the receiver electrodes receive resulting signals while transmitter electrodes are not transmitting transmitter signals. The capacitive sensor device can enable or disable noise mitigation based at least in part on the interference measurements.

One potential problem with some interference metrics is that, at certain narrow-band noise frequencies, the noise can be aliased by the sensing frequency and the burst length down to DC. If such aliasing occurs, the interference metrics can become a function of the phase of the noise. Since the phase of the noise can be zero, the interference measurements calculated according to the interference metrics can also be zero. If, at the same time, the noise is subject to a phase or frequency drift of its own, then a small interference measurement can occur despite the presence of significant noise in the capacitive measurements. In various embodiments, the capacitive sensing device removes effects of this aliasing, resulting in interference measurements that have nearly uniform variance as a function of frequency. In an embodiment, the capacitive sensing device receives resulting signals from receiver electrodes during a plurality of noise acquisition bursts while suspending transmission with transmitter electrodes. The resulting signals include effects of noise. The capacitive sensing device introduces at least one time delay between a respective at least one pair of the plurality of noise acquisition bursts. By adding time delay(s) between pair(s) of the noise acquisition bursts, the capacitive sensing device can prevent noise from being aliased to DC and thus increases the robustness of the interference measurements. These and further aspects are described further below.

Figure 1:
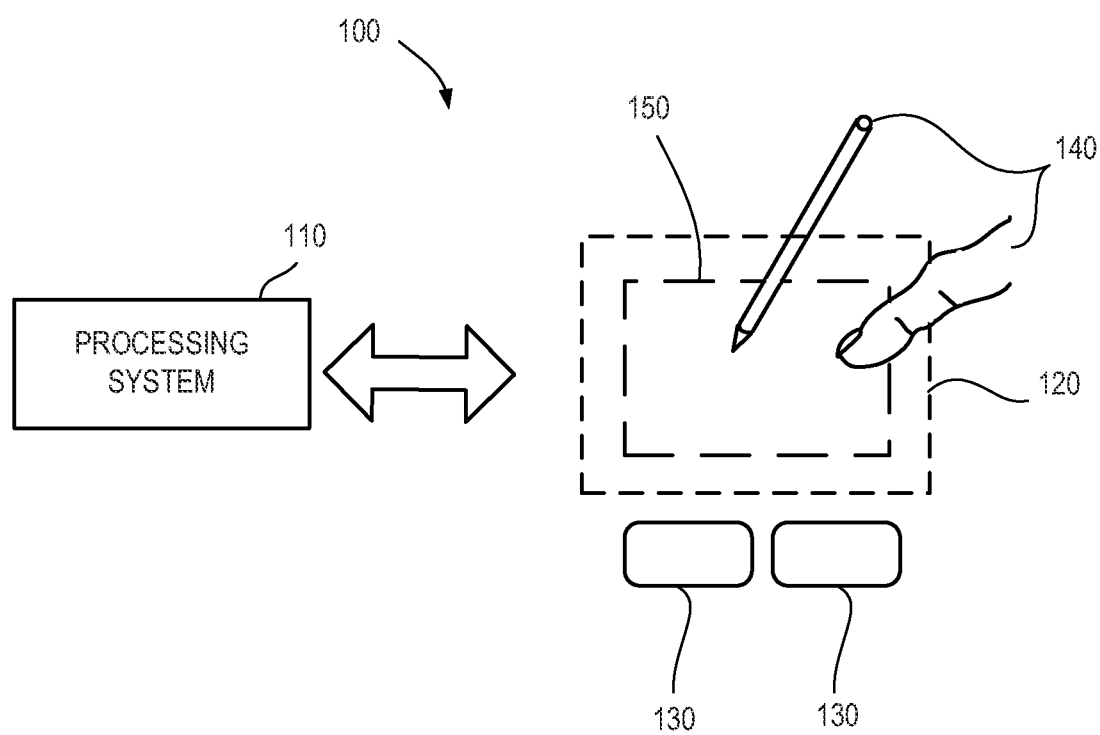
FIG. 1 is a block diagram of a system that includes an input device according to an example implementation.

Turning now to the figures, FIG. 1 is a block diagram of an exemplary input device 100 in accordance with embodiments. In various embodiments, the input device 100 comprises a sensing device and optionally a display device. In other embodiments, the input device 100 comprises a display device having an integrated sensing device, such as a capacitive sensing device. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice) and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections (including serial and or parallel connections). Examples include $I^2C$, SPI, PS/2, Universal Serial Bus (USB), Bluetooth, RF, and IRDA.

In the embodiment depicted in FIG. 1, the input device 100 is shown as a proximity sensor device (also often referred to as a "touchpad" or a "touch sensor device") configured to sense input provided by one or more input objects 140 in a sensing region 120. Example input objects 140 include fingers and styli, as shown in FIG. 1.

Sensing region 120 can overlay the display screen of a display device and encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100. The face sheet (e.g., an LCD lens) may provide a useful contact surface for an input object.

The input device 100 may utilize any combination of sensor components and sensing technologies to detect user input in the sensing region 120. The input device 100 comprises one or more sensing elements for detecting user input. Some implementations are configured to provide images that span one, two, three, or higher dimensional spaces. Some implementations are configured to provide projections of input along particular axes or planes. Cursors, menus, lists, and items may be displayed as part of a graphical user interface and may be scaled, positioned, selected scrolled, or moved.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements, such as sensor electrodes, to create electric fields. In some capacitive implementations, separate sensing elements may be ohmically shorted together to form larger sensor electrodes. Some capacitive implementations utilize resistive sheets (e.g., may comprise a resistive material such as ITO or the like), which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In FIG. 1, a processing system 110 is shown as part of the input device 100. The processing system 110 is configured to operate the hardware of the input device 100 to detect input in the sensing region 120. The sensing region 120 includes an array of sensing elements 150. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and/or the like. In some embodiments, components of the processing system 110 are located together, such as near sensing element(s) of the input device 100. In other embodiments, components of processing system 110 are physically separate with one or more components close to sensing element(s) of input device 100 and one or more components elsewhere. For example, the input device 100 may be a peripheral coupled to a desktop computer, and the processing system 110 may include software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 of the sensing device can overlap at least part of an active area of a display screen of a display device. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments are described in the context of a fully functioning apparatus, the mechanisms of the embodiments are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
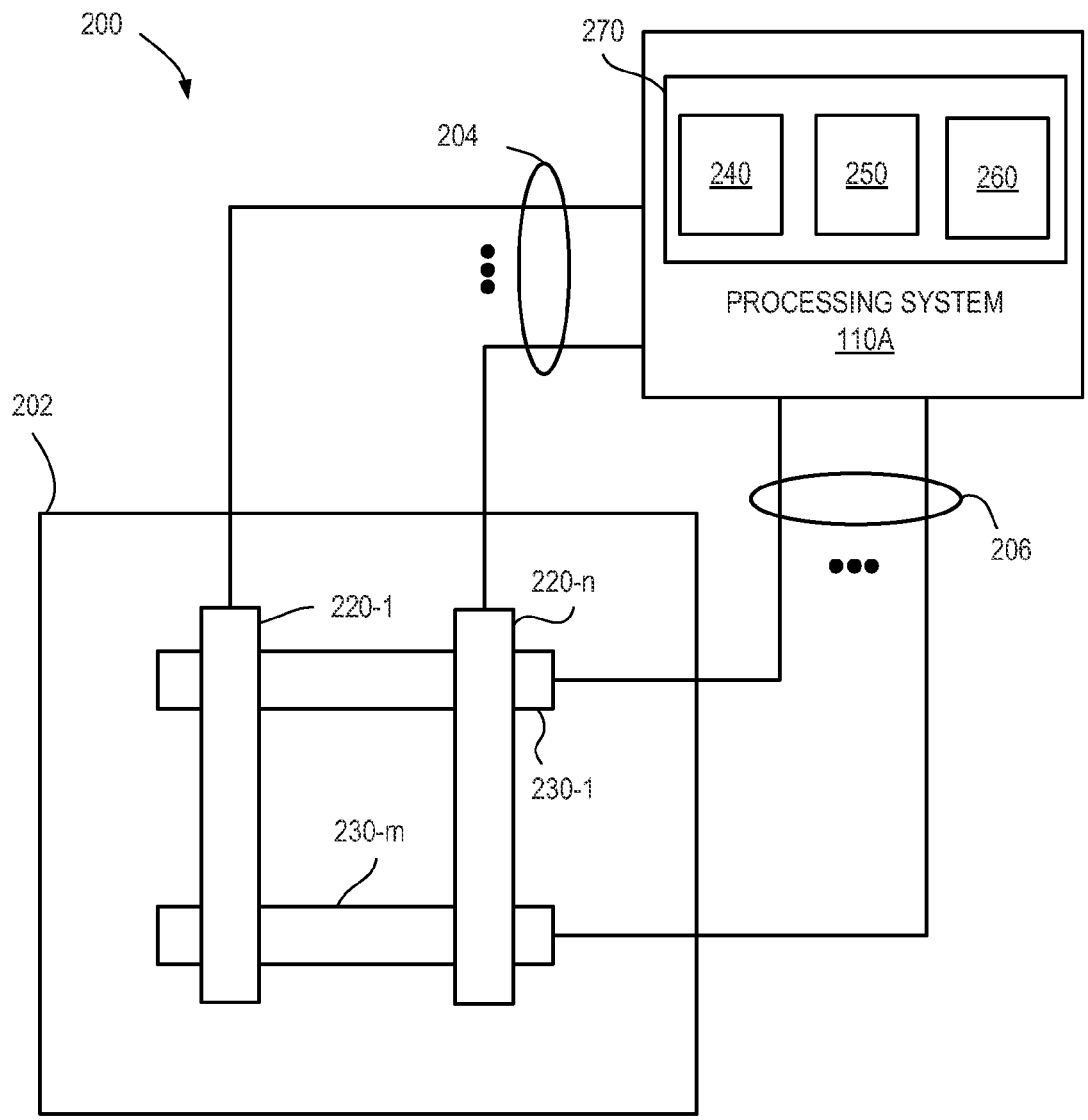
FIG. 2 is a block diagram depicting a capacitive sensor device for an input device according to an example implementation.

FIG. 2 is a block diagram depicting a capacitive sensor device 200 according to an example implementation. The capacitive sensor device 200 comprises an example implementation of the input device 100 shown in FIG. 1. The capacitive sensor device 200 includes sensor electrodes disposed on the substrate 202. The sensor electrodes function as sensing elements 150 of the capacitive sensor device 200. In the present example, the sensor electrodes include two pluralities of sensor electrodes 220-1 through 220-n (collectively "sensor electrodes 220", and 230-1 through 230-m (collectively "sensor electrodes 230"), where m and n are integers greater than zero. The sensor electrodes 220 and 230 are separated by a dielectric (not shown).

In some examples, the sensor electrodes 220 and the sensor electrodes 230 can be disposed on separate layers of the substrate 202. In other examples, the sensor electrodes 220 and the sensor electrodes 230 can be disposed on a single layer of the substrate 202. The electrodes 210 can be on the same and/or different layers as the sensor electrodes 220 and the sensor electrodes 230. While the sensor electrodes are shown disposed on a single substrate 202, in some embodiments, the sensor electrodes can be disposed on more than one substrate. For example, some sensor electrodes can be disposed on a first substrate, and other sensor electrodes can be disposed on a second substrate adhered to the first substrate. The sensor electrodes 220, 230 can have the same or different widths, sizes and/or shapes.

In the present example, the sensor electrode pattern is shown with the sensor electrodes 220, 230 arranged in an x/y grid of intersections. It is to be understood that the sensor electrode pattern is not limited to such an x/y arrangement, but instead can include numerous sensor patterns. Although the sensor electrode pattern is depicted as rectangular, the sensor electrode pattern can have other shapes, such as a circular shape.

The sensor electrodes 220 and 230 are coupled to an example implementation of the processing system 110 (referred to as "the processing system 110A") by conductive routing traces 204, 206. As used herein, general reference to the processing system 110 is a reference to the processing system described in FIG. 1 or any other embodiment thereof described herein (e.g., the processing system 110A, 1108, etc.). When in operation, the processing system 110A is coupled to the sensor electrodes 220, 230 through the conductive routing traces 204, 206 to implement the sensing region 120 for sensing inputs. In an embodiment, each set of sensor electrodes can have a dedicated function. For example, the sensor electrodes 230 can transmit transmitter signals generated by the processing system 110A or another device under control of the processing system 110A. The processing system 110A can receive resulting signals with the sensor electrodes 220. In such an embodiment, the sensor electrodes 230 are "transmitter electrodes" and the sensor electrodes 220 are "receiver electrodes." In some embodiments, one or more of the sensor electrodes 220 may be driven with absolute capacitive sensing signals for absolute capacitive sensing. In another embodiment, the sets of sensor electrodes do not have a dedicated function and the sensor electrodes 230 can function as either transmitter electrodes or receiver electrodes, and the sensor electrodes 220 can function as either receiver electrodes or transmitter electrodes.

The capacitive sensor device 200 can be located proximate to a system ground electrode (not shown) (e.g., located above a ground plane or backplane). "System ground" may indicate a common voltage shared by system components. For example, a capacitive sensing system of a mobile phone can, at times, be referenced to a system ground provided by the phone's power source (e.g., a charger or battery). The system ground may not be fixed relative to earth or any other reference. For example, a mobile phone on a table usually has a floating system ground. A mobile phone being held by a person who is strongly coupled to earth ground through free space may be grounded relative to the person, but the person-ground may be varying relative to earth ground. In many systems, the system ground is connected to, or provided by, the largest area electrode in the system. The capacitive sensor device 200 can be located proximate to such a system ground electrode (e.g., located above a ground plane or backplane).

The capacitive sensor device 200 can be utilized to communicate user input (e.g., a user's finger, a probe such as a stylus, and/or some other external input object) to an electronic system (e.g., computing device or other electronic device). For example, the capacitive sensor device 200 can be implemented as a capacitive touch screen device that can be placed over an underlying image or information display device (not shown). In this manner, a user would view the underlying image or information display by looking through substantially transparent elements in the sensor electrode pattern. When implemented in a touch screen, the substrate 202 can include at least one substantially transparent layer (not shown). The sensor electrodes 220, 230 and the conductive routing traces 204, 206 can be formed of substantially transparent conductive material. Indium tin oxide (ITO) and/or thin, barely visible wires are but two of many possible examples of substantially transparent material that can be used to form the sensor electrodes 220, 230 and/or the conductive routing traces 204, 206. In one or more embodiments the capacitive sensing device and display device share one or more elements. For example, one or more display electrodes may be driven for both capacitive sensing and display updating. Further, the conductive routing traces 204, 206 can be formed of non-transparent material, and then hidden in a border region (not shown) of the sensor electrode pattern.

In another example, the capacitive sensor device 200 can be implemented as a capacitive touchpad, slider, button, or other capacitance sensor. For example, the substrate 202 can be implemented with, but not limited to, one or more clear or opaque materials. Likewise, clear or opaque conductive materials can be utilized to form sensor electrodes and/or conductive routing traces for the sensor electrode pattern.

The processing system 110A can include one or more modules, such as a sensor module 240, a control module 250, and a determination module 260. The sensor module 240, the control module 250, and the determination module 260 comprise modules that perform different functions of the processing system 110A. In other examples, different configurations of modules can perform the functions described herein. The sensor module 240, the control module 250, and the determination module 260 can include sensor circuitry 270 and can also include firmware, software, or a combination thereof operating in cooperation with the sensor circuitry 270.

In an embodiment, the sensor module 240 can excite or drive sensor electrodes with signals. The terms "excite" and "drive" as used herein encompasses controlling some electrical aspect of the driven element. For example, it is possible to drive current through a wire, drive charge into a conductor, drive a substantially constant or varying voltage waveform onto an electrode, etc. When sensing transcapacitance, the sensor module 240 can drive transmitter electrodes (e.g., the sensor electrodes 230) with transmitter signals. A transmitter signal comprises a modulated signal, and generally includes a shape, frequency, amplitude, and phase. When sensing absolute capacitance, the sensor module 240 can drive sensor electrodes with absolute capacitive sensing signals. The absolute capacitive sensing signal comprises a modulated signal includes a shape, frequency, amplitude, and phase. In some embodiments, the absolute capacitive sensing signal may be similar to a transmitter signal. In other embodiments, the absolute capacitive sensing signal may differ from the transmitter signal in at least one of shape, amplitude and frequency.

The sensor module 240 can also receive resulting signals from sensor electrodes. The resulting signals can include effects of transmitter signals or absolute capacitive sensing signals, effects of input object(s), effects of noise, or a combination thereof. The sensor module 240 can drive transmitter electrodes while receiving with receiver electrodes, can receive with receiver electrodes without driving transmitter electrodes, and can drive transmitter electrodes without receiving with receiver electrodes. For example, for transcapacitive sensing, the sensor module 240 can drive transmitter signals onto transmitter electrodes while receiving resulting signals on receiver electrodes. For absolute capacitive sensing, the sensor module 240 can drive sensor electrodes with absolute capacitive sensing signals and receive resulting signals from the sensor electrodes. For noise sensing, the sensor module 240 can receive resulting signals on receiver electrodes without driving any of the sensor electrodes with transmitter signals or absolute capacitive sensing signals.

The control module 250 controls the sensor module 240 and the determination module 260. The control module 250 can implement various capacitive sensing modes, such as transcapacitive sensing, absolute capacitive sensing, and noise sensing. The control module 250 can control various aspects of the sensor module 240, such as the sensing frequency, the sensing cycle, the acquisition burst length, transmitter firing, receiver operation, and the like. The control module 250 can control the determination module 260 to determine various types of information, such as a capacitive baseline, changes in capacitance, positional information for input object(s), noise information, and the like. While the processing system 110A is shown as having a separate control module 250, in other embodiments, all or a portion of the functions described as being performed by the control module 250 can instead be performed by one or more other modules. For example, in some embodiments, the control module 250 is omitted and the sensor module 240 or the determination module 260 can be configured to individually, or in combination, perform the functions of the control module 250.

The sensor module 240 generates measurements of some characteristic of the resulting signals, such as voltage, current, charge, or the like. The determination module 260 receives the measurements from the sensor module 240. The determination module 260 derives information from the measurements. For example, the determination module 260 can determine a baseline capacitance for the sensor electrode pattern, determine changes in mutual capacitance between sensor electrodes and/or changes in self-capacitance of sensor electrodes, and compare changes in capacitance with the baseline to detect object presence, position, motion, etc. The changes in capacitance can be associated with specific locations of the sensing region 120 to create a "capacitive image" or "capacitive frame." The changes in capacitance can be associated with a specific axis of the sensing region 120 to create a "capacitive profile" along that axis. When compensated with the baseline, the capacitive image(s) and/or capacitive profile(s) enable the sensing of contact, hovering, or other user input with respect to the formed sensing regions by the sensor electrode pattern. The determination module 260 can determine positional information, size, type, and the like of input object(s).

The determination module 260 and the control module 250 can cooperate to detect and mitigate noise. The determination module 260 can detect noise from the measurements generated by the sensor module 240. The determination module 260 can measure noise to mitigate its effects on capacitive measurements. In an embodiment, the determination module 260 can process the measurements to generate interference measurements based on one or more interference metrics (IMs). Noise can be measured through a plurality of noise acquisition bursts using receiver electrodes, as discussed below. The control module 250 can enable or disable noise mitigation based at least in part on the interference measurements. For example, if the interference measurements indicate the presence of noise above a certain threshold, the control module 250 can implement a high-noise mode. If the interference measurements indicate the presence of noise below a certain threshold, the control module 250 can disable the high-noise mode. As described further below, the control module 250 can introduce at least one time delay between a respective at least one pair of the plurality of noise acquisition bursts. By adding a time delay between pair(s) of the noise acquisition bursts, the control module 250 can reduce or eliminate noise aliasing and increase the robustness of the interference measurements.

Figure 3:
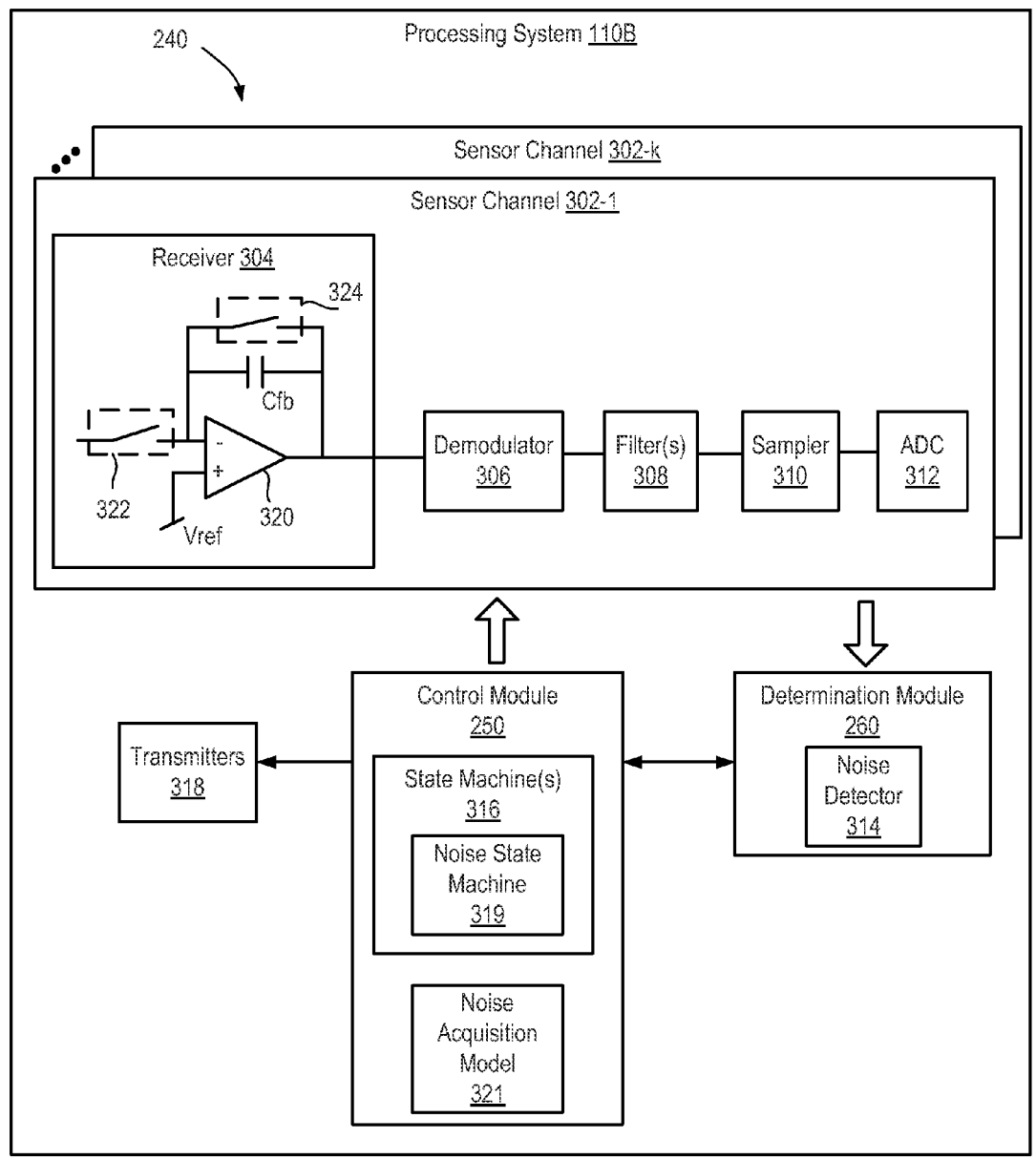
FIG. 3 is a block diagram of a processing system according to an example implementation.

FIG. 3 is a block diagram of a processing system 110b according to an example implementation. The processing system 110b is an embodiment of the processing system 110a shown in FIG. 2. The processing system 110b includes the sensor module 240, the control module 250, and the determination module 260. The sensor module 240 includes sensor channels 302-1 through 302-k, where k is an integer greater than zero (collectively referred to as "sensor channels 302"). In an embodiment, the sensor module 240 can also include transmitters 318. In another embodiment, the transmitters 318 can be external to the processing system 110b. For example, the transmitters 318 can be part of a display controller. In an embodiment, each of the sensor channels 302 includes a receiver 304, a demodulator 306, filter(s) 308, a sampler 310, and an analog-to-digital converter (ADC) 312. The receiver 304 includes, for example, a sensor switch 322, an integrating amplifier 320, a feedback capacitance Cfb, and a reset switch 324. In other examples, the sensor switch 322 can be omitted or some other high-impedance connection can be used in place of the sensor switch 322. In other examples, a resistor can be used in place of the reset switch 324. Thus, other configurations of the receiver 304 can be used in the sensor channels 302 and embodiments described herein are not limited to any particular receiver architecture. In other embodiments, the sensor channels 302 can have a different architecture than that shown in FIG. 3. For example, another implementation includes a receiver coupled directly to an ADC, where demodulation and filtering are performed in the digital domain rather than in the analog domain. Thus, the embodiments described herein are not limited to any particular architecture of the sensor channels 302. The determination module 260 can include a noise detector 314. The control module 250 can include at least one state machine (state machine(s) 316).

The sensor channels 302 are coupled to sensor electrodes (shown in FIG. 2). The receiver 304 in each of the sensor channels 302 receives a resulting signal from a sensor electrode. The sensor switch 322 controls whether the resulting signal is coupled to an inverting input of the integrating amplifier 320. A reference voltage is coupled to a non-inverting input of the integrated amplifier. The feedback capacitance Cfb and the reset switch 324 are coupled between the output and the inverting input of the integrating amplifier 320. When the sensor switch 322 is closed, the integrating amplifier 320 integrates the resulting signal. The feedback capacitance Cfb accumulates charge. The reset switch 324 can be closed to drain the accumulated charge from the feedback capacitance Cfb. The receiver 304 can accumulate charge and then reset one or more times to implement a sensing cycle. The demodulator 306 samples the output voltage of the integrating amplifier 320 for each accumulated charge to obtain measurement(s) for each sensing cycle.

The demodulator 306 mixes a signal having a sensing frequency with the measurements from the receiver 304 to translate the measurements to baseband (e.g., remove a carrier signal from the measurements). The measurements are then filtered by the filter(s) 308. The filter(s) 308 can include, for example, a low-pass filter to remove high-frequency noise from the measurements. The sampler 310 receives the measurements from the filter(s) 308. The sampler 310 combines measurements over a plurality of sensing cycles referred to as an acquisition burst. The ADC 312 generates digital samples of combined measures for each acquisition burst, which are output to the determination module 260. The determination module 260 processes the measurements for each acquisition burst to derive information.

The control module 250 controls each of the sensor channels 302 using the state machine(s) 316. The state machine(s) 316 can include various state machines, such as a sensing state machine to control the transmitters 318, the receivers 304, and the sampling by the demodulators 306; a filter state machine to control the demodulators 306, the filters 308, and the samplers 310; and an ADC state machine to control the ADCs 312. Other configurations of state machines can be used. For capacitive sensing, the control module 250 controls the transmitters 318 to drive transmitter electrodes with transmitter signals having a selected sensing frequency. The control module 250 controls the receivers 304 in the sensor channels 302 to receive resulting signals from receiver electrodes. The control module 250 controls the determination module 260 to determine capacitive frame(s) from measurements generated over one or more acquisition bursts by each of the sensor channels 302.

In an embodiment, the state machine(s) 316 include a noise state machine 319. The noise state machine 319 controls when the processing system 110b operates to detect noise. In one embodiment, the noise state machine 319 triggers noise detection between capacitive frames. For example, the noise state machine 319 can trigger noise detection at the end of every capacitive frame or every jth capacitive frame, where j is an integer greater than one. During noise detection, the control module 250 controls the transmitters 318 to suspend transmitting on the transmitter electrodes. Since the transmitters 318 do not drive the transmitter electrodes, the resulting signals comprise effects of noise without effects of the transmitter signals. During noise detection, the sampler 310 combines measurements over a plurality of sensing cycles referred to as a noise acquisition burst.

The noise state machine 319 controls the sampler 310 to combine measurements over a plurality of noise acquisition bursts. The noise state machine 319 introduces at least one time delay between a respective at least one pair of the plurality of noise acquisition bursts. For example, the noise state machine 319 can trigger measurements over a sequence of at least three noise acquisition bursts. In some examples, a time delay can be inserted between each pair of the noise acquisition bursts. A time delay is some real number of time units other than zero. In other examples, time delays can be inserted between some pairs of the noise acquisition bursts, while there is no time delay (or zero time delay) between other pairs of the noise acquisition bursts. In an embodiment, there is no time delay between one pair of the noise acquisition bursts in the sequence, while time delays are inserted between the other pairs of the noise acquisition bursts. For example, there can be no time delay between the first and second noise acquisition bursts, while time delays can be inserted between the other pairs of noise acquisition bursts.

The control module 250 can include a noise acquisition model 321. The noise state machine 319 can determine the values for the non-zero time delays between noise acquisition bursts from the noise acquisition model 321. The noise acquisition model 321 can be pre-determined through simulation and/or experiment. In an embodiment, the noise acquisition model 321 can include a time delay value for each of a plurality of numbers of noise acquisition bursts in a sequence (e.g., a time delay for 2 bursts, another time delay for 3 bursts, another time delay for 4 bursts, etc.). For a given number of noise acquisition bursts, a time delay can be determined by first calculating the variance of a given interference metric over time to obtain a first function. The first function is a function of frequency. The variance of the first function is then calculated over frequency to obtain a second function. The second function is then minimized over time delay to determine an optimal time delay. Optimal time delays for different numbers of noise acquisition bursts can be determined and combined to form the noise acquisition model 321. The time delays of the noise acquisition module 312 are optimized to give uniform interference metric sensitivity as a function of frequency. In some cases, a given time delay can be less than a cycle of the sensing frequency. In other cases, a given time delay can be greater than a cycle of the sensing frequency.

During the noise detection, the noise state machine 319 controls the determination module 260 to perform noise detection on the measurements. The noise detector 314 can detect narrow-band noise, the waveform of which can be sinusoidal, periodic non-sinusoidal, or quasi-period non-sinusoidal. An example of such narrow-band noise is noise introduced by a battery charger in a device having the capacitive sensor. The noise detector 314 processes the measurements obtained from each of the sensor channels 302 over the sequence of noise acquisition measurements to compute an interference measurement for the current sensing frequency. One type of interference metric can be measured, for example, as the maximum over all sensor channels 302 of the sum of the square of the measurements (less a baseline) over all noise acquisition bursts. The noise detector 314 can return the interference measurements to the noise state machine 319.

The noise state machine 319 can compare the interference measurement to one or more thresholds and implement one or more noise mitigation schemes. For example, the noise state machine 319 can change or provide an indication of change of the sensing frequency from a first frequency to a second frequency in response to the interference measurements satisfying a particular threshold. The sensing frequency of the transmitter signals can be a first frequency in one capacitive frame, and then a second frequency in the next capacitive frame based on the interference measurement obtained by noise detection between the frames. In another example, the noise state machine 319 can configure the sensor channels 302 to operate in a high-noise mode in response to the interference measurements satisfying a particular threshold. In a high-noise mode, the sensing cycle can be lengthened (i.e., longer integration of the resulting signals), the length of the acquisition bursts can be increased (i.e., each measurement is combined from more sensing cycles), and/or the determination module 260 can invoke one or more noise mitigation algorithms on the measurements. Other types of known noise mitigation techniques can be employed based on the interference measurements. In another example, the noise state machine 319 can trigger a frequency scan to identify a new sensing frequency in response to the interference measurements satisfying a particular threshold. During a frequency scan, the control module 250 controls the processing system 110b to measure noise for a plurality of different sensing frequencies to identify an optimal sensing frequency.

The calculation of an interference measurement is improved by introducing time delays between pairs of noise acquisition bursts in the sequence during noise detection. By adding time delay(s) between pair(s) of the noise acquisition bursts, the processing system 110b can prevent noise from being aliased to DC and thus increases the robustness of the interference measurements.

In some examples, the control module 250 implements noise detection using three noise acquisition bursts. A lower number of noise acquisition bursts reduces the duration of the noise detection, which can allow for increases capacitive frame rate (i.e., less time between capacitive frames), or allow for longer acquisition burst lengths and/or integration durations during capacitive sensing. The noise detection process described herein also can be used to optimize the frequency scan process, increasing the reliability of the frequency scan process and allowing faster completion of the frequency scan process.

As described above, in some embodiments, the control module 250 is omitted and its functions distributed among other modules, such as the sensor module 240 and the determination module 260. Thus, the state machines 316, including the nose state machine 319, and the noise acquisition model 321 can be included in the sensor module 240, the determination module 260, or a combination thereof.

Figure 4:
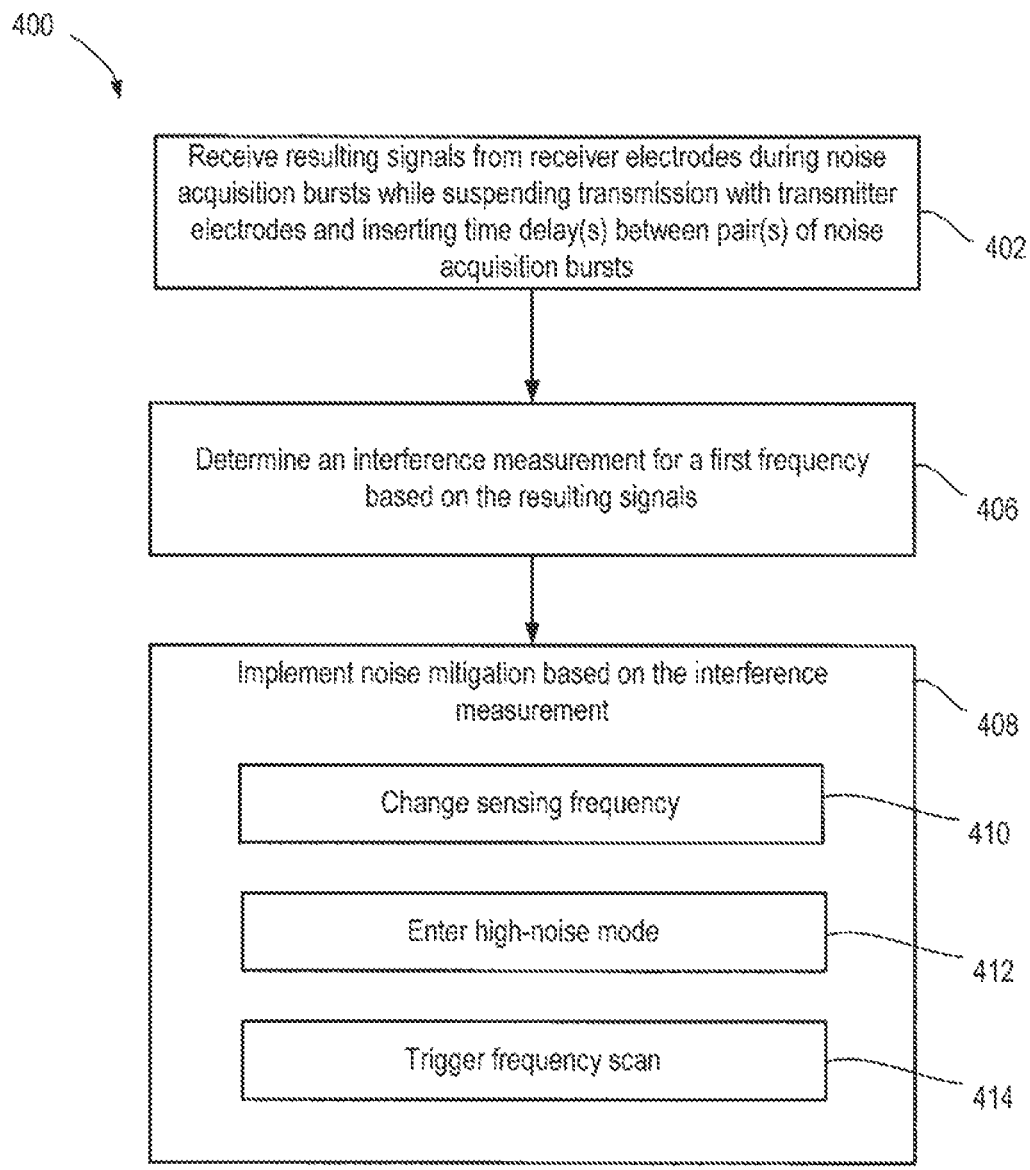
FIG. 4 is a flow diagram depicting a method of operating a capacitive sensing device having a plurality of transmitter electrodes and a plurality of receiver electrodes according to an example implementation.

FIG. 4 is a flow diagram depicting a method 400 of operating a capacitive sensing device having a plurality of transmitter electrodes and a plurality of receiver electrodes according to an example implementation. The method 400 can be performed by the processing system 110b described above. The method 400 begins at step 402, wherein the processing system 110b receives resulting signals from receiver electrodes during a sequence of noise acquisition bursts while suspending transmission with the transmitter electrodes, where the processing system 110b inserts time delay(s) between pair(s) of the noise acquisition bursts. For example, as described above, a noise detection process can be performed between sensing of capacitive frames. At step 406, the processing system 110b determines an interference measurement for a first frequency based on the resulting signals. The first frequency can be the sensing frequency used during a previous capacitive frame.

At step 408, the processing system 110b can implement noise mitigation based on the interference measurement. For example, at step 410, the processing system 110b can change the sensing frequency from the first frequency to a second frequency different than the first frequency. At step 412, the processing system 110b can enter a high-noise mode. At step 414, the processing system 110b can trigger a frequency scan to identify a new sensing frequency. In an embodiment, the processing system 110b can perform a combination of noise mitigation techniques, such as changing the sensing frequency and invoking a high-noise mode.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system for a capacitive sensing device, comprising:
   a sensor module comprising sensor circuitry coupled to a plurality of transmitter electrodes and a plurality of receiver electrodes, the sensor module configured to:
   receive resulting signals from the plurality of receiver electrodes during a plurality of noise acquisition bursts while suspending transmission with the plurality of transmitter electrodes, the resulting signals comprising effects of noise; and introduce at least one time delay between a respective at least one pair of the plurality of noise acquisition bursts; and a determination module configured to determine an interference measurement for a first frequency based on the resulting signals.

2. The processing system of claim 1, wherein the plurality of noise acquisition bursts comprises a sequence of at least three noise acquisition bursts, and wherein the sensor module is configured to introduce the at least one time delay between the respective at least one pair of the plurality of noise acquisition bursts by introducing a time delay between each of the at least three noise acquisition bursts other than between one pair of noise acquisition bursts in the sequence.

3. The processing system of claim 2, wherein the one pair of noise acquisition bursts in the sequence comprises first and second noise acquisition bursts in the sequence.

4. The processing system of claim 1, wherein the plurality of noise acquisition bursts comprises a sequence of at least three noise acquisition bursts, and wherein the sensor module is configured to introduce the at least one time delay between the respective at least one pair of the plurality of noise acquisition bursts by introducing a time delay between each of the at least three noise acquisition bursts.

5. The processing system of claim 1, wherein the sensor module is further configured to shift from transmitting a first transmitter signal having the first frequency with the plurality of transmitter electrodes to transmitting a second transmitter signal having a second frequency different than the first frequency based on the interference measurement.

6. The processing system of claim 5, wherein the determination module determines the interference measurement between a first input sensing frame and a second input sensing frame, and wherein the sensor module shifts from transmitting the first transmitter signal having the first frequency during the first input sensing frame to transmitting the second transmitter signal having the second frequency during the second input sensing frame.

7. The processing system of claim 1, wherein the sensor module is configured to enter a high-noise mode based on the interference measurement.

8. A method of operating a capacitive sensing device having a plurality of transmitter electrodes and a plurality of receiver electrodes, the method comprising:

receiving resulting signals from the plurality of receiver electrodes during a plurality of noise acquisition bursts while suspending transmission with the plurality of transmitter electrodes, the resulting signals comprising effects of noise;

introducing at least one time delay between a respective at least one pair of the plurality of noise acquisition bursts; and determining an interference measurement for a first frequency based on the resulting signals.

9. The method of claim 8, wherein the plurality of noise acquisition bursts comprises a sequence of at least three noise acquisition bursts, and wherein the step of introducing the at least one time delay between the respective at least one pair the plurality of noise acquisition bursts further comprises introducing a time delay between each of the at least three noise acquisition bursts.

10. The method of claim 8, wherein the plurality of noise acquisition bursts comprises a sequence of at least three noise acquisition bursts, and wherein the step of introducing the at least one time delay between the respective at least one pair of the plurality of noise acquisition bursts further comprises introducing a time delay between each of the at least three noise acquisition bursts other than between one pair of noise acquisition bursts in the sequence.

11. The method of claim 8, wherein each of the at least one time delay is less than a sensing cycle of a transmitter signal having the first frequency.

12. The method of claim 8, wherein each of the at least one time delay is greater than a sensing cycle of a transmitter signal having the first frequency.

13. The method of claim 8, wherein the at least one time delay is determined by minimizing a first function, the first function being variance of a second function over frequency, the second function being variance of the interference measurement over time.

14. The method of claim 8, further comprising:
shifting from transmitting a first transmitter signal having the first frequency with the plurality of transmitter electrodes to transmitting a second transmitter signal having a second frequency different than the first frequency based on the interference measurement.

15. The method of claim 14, wherein the interference measurement is determined between a first input sensing frame and a second input sensing frame of the capacitive sensing device, and wherein the first transmitter signal is transmitted in the first input sensing frame and the second transmitter signal is transmitted in the second input sensing frame.

16. The method of claim 8, further comprising:
enter a high-noise mode in the capacitive sensing device based on the interference measurement.

17. An input device, comprising:
a plurality of transmitter electrodes;
a plurality of receiver electrodes; and
a processing system, coupled to the plurality of transmitter electrodes and the plurality of receiver electrodes, the processing system configured to:
receive resulting signals from the plurality of receiver electrodes during a plurality of noise acquisition bursts while suspending transmission with the plurality of transmitter electrodes, the resulting signals comprising effects of noise;
introduce at least one time delay between a respective at least one pair of the plurality of noise acquisition bursts; and
determine an interference measurement for a first frequency based on the resulting signals.

18. The input device of claim 17, wherein the processing system is further configured to shift from transmitting a first transmitter signal having the first frequency with the plurality of transmitter electrodes to transmitting a second transmitter signal having a second frequency different than the first frequency based on the interference measurement.

19. The input device of claim 18, wherein the processing system determines the interference measurement between a first input sensing frame and a second input sensing frame and shifts from transmitting the first transmitter signal having the first frequency during the first input sensing frame to transmitting the second transmitter signal having the second frequency during the second input sensing frame.

20. The input device of claim 17, wherein the processing system is configured to enter a high-noise mode based on the interference measurement.

* * * * *